United States Patent [19]

Beaumont et al.

[11] Patent Number: 4,646,159
[45] Date of Patent: Feb. 24, 1987

[54] UNITARY CRT DISPLAY ASSEMBLY

[75] Inventors: Gregory J. Beaumont, Arlington Heights; Casimir J. Duval, Addison; Frank N. Kula, Downers Grove; Michael S. Tamkin, Northbrook, all of Ill.

[73] Assignee: Zenith Electronics Corporation, Glenview, Ill.

[21] Appl. No.: 593,751

[22] Filed: Mar. 27, 1984

[51] Int. Cl.⁴ .......................................... H04N 5/064
[52] U.S. Cl. .................................. 358/254; 358/246; 358/248
[58] Field of Search ................ 358/245, 246, 248, 254

[56] References Cited

U.S. PATENT DOCUMENTS

| | | | |
|---|---|---|---|
| 2,917,735 | 12/1959 | Travis et al. | 358/248 |
| 2,922,997 | 7/1960 | Solheim | 358/248 |
| 2,970,311 | 1/1961 | De Mapoli et al. | 358/246 |

Primary Examiner—Edward L. Coles, Sr.
Attorney, Agent, or Firm—Cornelius J. O'Conner; Nicholas A. Camasto

[57] ABSTRACT

A unitary CRT display assembly comprises a chassis pan for supporting a printed circuit chassis and components from a CRT by means of an adjustable tension strap surrounding the periphery of the CRT faceplate or by a pair of mounting lugs coupled to the mounting ears of the CRT. The construction enables the chassis pan, CRT and components to be shipped, handled and readily assembled as a unit into a manufacturer's cabinet.

8 Claims, 5 Drawing Figures

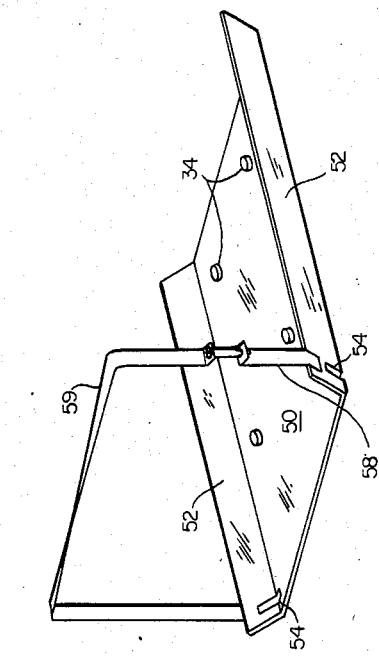
FIGURE 3
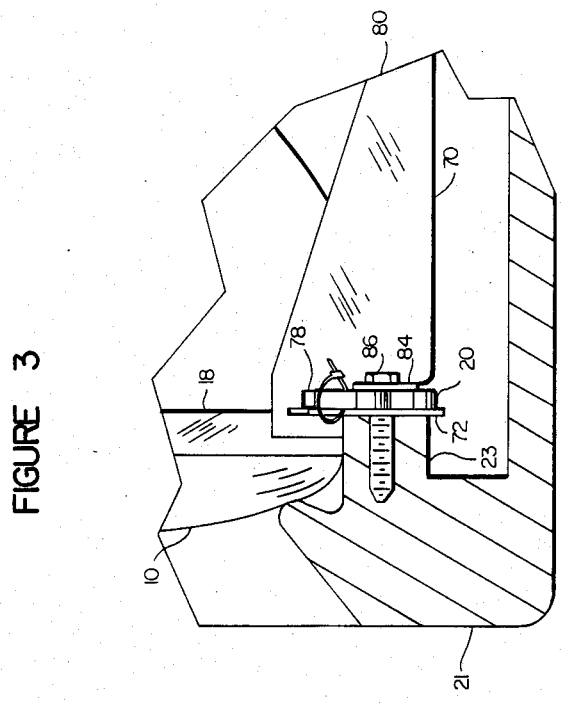
FIGURE 5
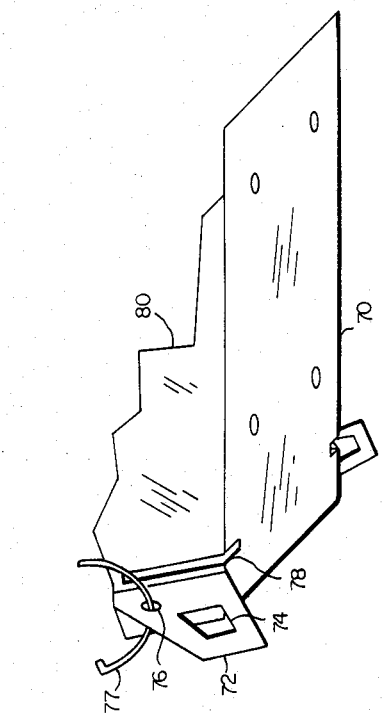
FIGURE 2
FIGURE 4

UNITARY CRT DISPLAY ASSEMBLY

BACKGROUND OF THE INVENTION AND PRIOR ART

This invention relates generally to cathode ray tube (CRT) display apparatus and specifically to CRT display apparatus used as subassemblies for original equipment manufacturers (OEM's).

CRT displays are being increasingly used as computer video outputs, video monitors and vehicular displays, as distinct from their traditional roles in television receivers. A CRT display is much simpler than a television receiver since only baseband signal processing circuitry and some means for "scanning" the CRT screen are required. It is quite common to have a small printed circuit board type chassis which, along with the CRT and associated scanning yoke, is supplied as a non-unitary "subassembly" to OEM producers of computers, monitors, vehicular display apparatus and the like, which the OEM installs in a cabinet or equipment of his own. A common practice is to ship all of the components of the CRT display assembly, that is, the CRT, the yoke, and the chassis in connected-together-and-ready-to-operate fashion in a suitable supporting carton. The OEM merely unpacks the assembly and installs the individual connected parts into his own cabinet, usually in conjunction with other equipment of his manufacture.

For many years CRT's have been installed in cabinets by means of a plurality of mounting ears held in position at the four corners of the CRT faceplate by an anti-implosion band tightly embracing the periphery of the faceplate. As is well known, the very tight band exerts compressive forces in the faceplate to provide implosion protection and thereby eliminate the need for a separate safety glass. The cabinet, or panel in the case of a panel mounted CRT assembly, is provided with a corresponding plurality of bosses to which the mounting ears of the CRT are secured, by means of screws or the like. Generally speaking, the bosses and the cabinets are made of plastic.

It would be highly desirable to ship the CRT and all components mounted together, as well as connected together, for convenience and ease of installation in the cabinet of the manufacturer. However, tolerances on placement of the cabinet bosses, location of the mounting ears on the CRT, general cabinet dimensions and a lack of a support chassis have heretofore made it impractical to ship the CRT and components in an easily handled, assembled condition to OEM's.

OBJECTS OF THE INVENTION

The principal object of this invention is to provide a novel CRT display assembly.

A further object of this invention is to provide a CRT display assembly that is readily installed by OEM's.

Another object of this invention is to provide a CRT display assembly that solves the problems of the prior art.

SUMMARY OF THE INVENTION

In accordance with the invention, a unitary CRT display assembly adapted for ready installation in a cabinet comprises a CRT having a faceplate structure including mounting ears and an anti-implosion band, a chassis including a mounting pan separate from the CRT and means supporting the mounting pan from the CRT faceplate structure for installation into the cabinet.

BRIEF DESCRIPTION OF THE DRAWINGS

Further objects and advantages of the invention will become apparent upon reading the following description in conjunction with the drawings in which:

FIG. 2 is a side sectional view of the CRT display assembly constructed in accordance with the invention mounted in a cabinet;

FIG. 3 is a perspective view of a chassis pan and mounting strap utilized in one form of the invention;

FIG. 4 is a bottom perspective view of a chassis pan utilized in another form of the invention; and FIG. 5 is a partial cross sectional view illustrating the mounting arrangement using the chassis pan of FIG. 4.

DESCRIPTION OF THE PREFERRED EMBODIMENT

Figure 1:
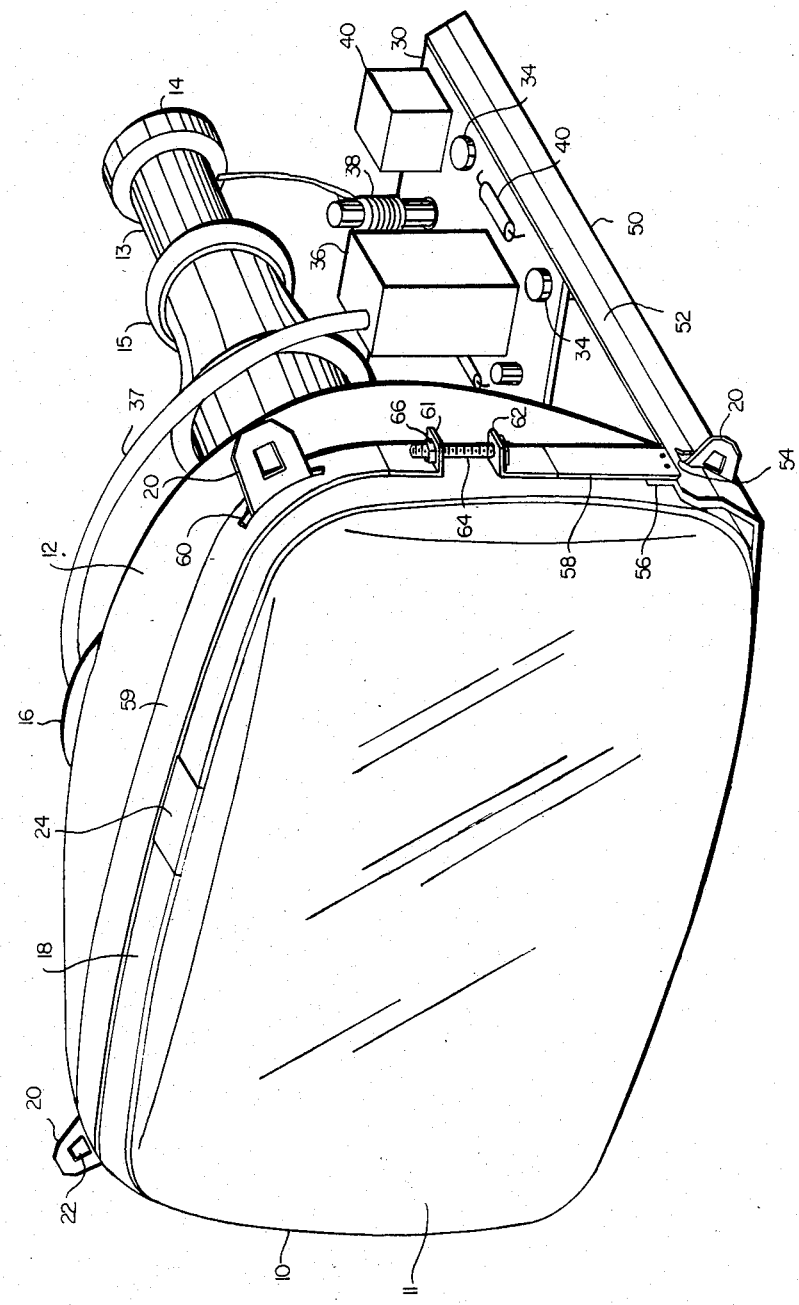
FIG. 1 is a perspective view of the CRT display assembly of the invention.

Referring to FIG. 1, a CRT 10 includes a generally rectangular faceplate 11 attached to an envelope 12 which terminates in an elongated cylindrical neck 13. A socket 14 makes connection with a plurality of pins (not shown) extending from the end of neck 13 for supplying certain operating potentials and signal inputs to the CRT electron gun structure (also not shown), all in a well-known manner. A yoke 15 is positioned on the CRT neck in close proximity to the envelope for developing suitable electromagnetic forces for deflecting the CRT electron beam across the faceplate in a regular manner. An anti-implosion band 18 encircles the periphery of faceplate 11. Band 18, in a conventional manner, supports four mounting ears 20, located at each of the corners of the faceplate. Each mounting ear includes a relatively large aperture 22 for supporting the CRT to a suitable panel structure or cabinet by its mounting ears 20. The large apertures help compensate for minor mislocation of the mounting ears during installation of the anti-implosion band. The band is suitably tensioned and held in that condition by a crimp connector 24.

A printed circuit board chassis 30 is supported in position on a chassis pan 50 by a plurality of insulated supports 34 carried thereby. A high voltage transformer 36, having a high voltage lead 37 connected to an anode cap 16, supplies high voltage operating potential to CRT 10. A tuning coil 38 and other electrical components 40 are positioned on the printed circuit board chassis. These components should be understood to be merely illustrative of the electrical elements that may be required in a conventional CRT display assembly.

Chassis pan 50 includes a pair of upturned side flanges 52, only one of which is visible in FIG. 1. Each flange 52 includes a slot 54 through which a mounting ear of the CRT can protrude. Each flange 52 has an upwardly extending tab 56 which provides an attachment point for metal support straps. A first relatively short metal strap 58 terminating in a mounting end piece 62 is shown. A second, much larger metal strap 59 is affixed to another tab 56 (not visible) and extends around the upper periphery of faceplate 11 and includes a pair of slots 60 through which the top two mounting ears 20 protrude. The free end of strap 59 terminates in a mounting end piece 61. Mounting end piece 61 and 62 may be drawn together to apply tension to straps 58 and 59 by means of a bolt 64 extending through end pieces 61 and 62 and into engagement with a corresponding nut 66.

It will be appreciated that faceplate 11, band 18 and mounting ears 20 provide a faceplate structure that is quite strong and capable of supporting a substantial load. It is this faceplate structure which is used in accordance with the invention to support chassis pan 50 and, in turn, chassis 30 and its electrical components during shipping and installation. Further the thus assembled CRT display apparatus can be conveniently and easily handled as a single unit by the manufacturer during installation in a cabinet.

The slots in the mounting strap assist in captivating the chassis pan and enabling it to be attached to the CRT while still being capable of slight positioning adjustments with respect thereto. This is highly desirable since, in most instances, the chassis pan is to be securely mounted to the cabinet for which some small amount of movement is required between the chassis pan and the CRT.

On certain CRT's, the mounting ears are turned 180 back-to-front and are therefore much closer to the front of the faceplate. In that event, mounting straps 58 and 59 would be positioned behind the mounting ears instead of protruding through the mounting strap slots as shown. The bolt and nut may be loosened slightly prior to installation to provide for the desirable small movement between the chassis pan and the CRT. It should also be obvious that the chassis pan may be secured by the mounting straps in different ways not requiring slots or engagement with the CRT mounting ears. It will be appreciated that while the chassis pan is illustrated as being horizontal, it may as easily be vertical by simple and obvious changes in the pan design and strap configuration. Such modifications are to be considered a part of this invention.

In FIG. 2, there is shown a cross section of a cabinet 21 having mounting bosses 23 for supporting CRT 10 by means of mounting ears 20. A cabinet support 25 is indicated beneath chassis pan 50 with a fastener 27 being used to firmly secure the chassis pan to the cabinet. It can readily be seen that with the unitary CRT display assembly constructed in accordance with the invention, the display may be conveniently and easily installed in the cabinet.

In FIG. 3, chassis pan 50 with straps 58 and 59 attached, but without the CRT and printed circuit board chassis, is shown to better illustrate their construction. The arrangement of straps 58 and 59 on flanges 52 of the chassis pan is clearly illustrated.

In FIGS. 4 and 5 a different form of a chassis pan for use with the invention is illustrated. In FIG. 4, a bottom perspective view of a chassis pan 70 is shown in which the pan includes a pair of outwardly extending mounting lugs 72. Each of the lugs includes an enlarged aperture 74 and a small hole 76. Pan 70 also has a pair of upturned lips 80, only one of which is illustrated, from which lugs 72 extend. Immediately behind each lug 72 is a slot 78, through which a mounting ear of the CRT can protrude. No mounting straps are utilized with this construction. Rather, the chassis pan is affixed to the CRT by means of holes 76 through which are passed suitable plastic fastening ties or the like. The plastic fastening ties are also passed through similar holes in the respective mounting ears of the CRT. If suitable holes are not provided in the ears, the ties may also be passed through the mounting apertures of the mounting ears. The ties are preferably of the self-locking type which may be drawn up to hold the chassis pan (and the printed circuit board chassis) to the CRT during shipment and assembly. During installation the plastic ties may either be cut free or left in place since compression between the lug 72 and cabinet boss or CRT mounting ear will have no undesirable effect on the installation.

In FIG. 5 the unitary chassis pan and CRT assembly is shown attached to a boss in a cabinet. Cabinet 21 includes a cabinet boss 23 provided with a suitable hole for receiving a threaded bolt or screw 86, with which a large washer 84 may be used because of the enlarged mounting aperture in the mounting ear. Lug 72 on the chassis pan is tightly compressed between boss 23 of the cabinet and mounting ear 20 on the CRT. Self-locking plastic tie 77 is illustrated in position. The other suitable fastener means, for securing the chassis pan to the cabinet, are not shown in this view, but should be assumed.

While the mounting ears for the CRT have been illustrated as being attached by means of a tension band, it will be recognized that so-called Shell-bond tubes in which a surrounding metal frame is epoxied to the CRT faceplate are also within the purview of this invention. Such tubes have the mounting "ears" formed as part of the metal frame and the epoxy operates to provide the anti-implosion protection.

It is thus seen that with the invention a simple, low cost unitary CRT display assembly may be conveniently transported to a manufacturer for ready installation into a cabinet. It is recognized that numerous changes in the described embodiment of the invention will be apparent to those skilled in the art without departing from the true spirit and scope thereof. The invention is to be limited only as defined in the claims.

We claim:

1. A unitary CRT display assembly adapted for ready installation in a cabinet comprising:

a CRT having a faceplate structure including mounting ears in an anti-implosion means affixing the mounting ears to the faceplate;

a chassis and a chassis mounting pan separate from said CRT, said chassis mounting pan being supported from said CRT faceplate structure for enabling small movements thereof in said cabinet;

cabinet support means for firmly supporting said chassis mounting pan in position in said cabinet;

means including a strap having slots, with said mounting ears protruding through said slots when said strap is in engagement with said faceplate structure for supporting said chassis mounting pan from said CRT faceplate structure for installation into said cabinet; and tension adjustment means on said strap.

2. The display assembly of claim 1 wherein said strap engages said faceplate structure behind said mounting ears.

3. A unitary CRT display assembly adapted for ready installation in a cabinet comprising:

a CRT having a faceplate structure including mounting ears and an anti-implosion means affixing said mounting ears to said faceplate;

a chassis and a chassis mounting pan separate from said CRT, said chassis mounting pan being supported from said CRT faceplate structure for enabling small positioning movements thereof in said cabinet;

cabinet support means for firmly supporting said chassis mounting pan in position in said cabinet; and means supporting said chassis mounting pan from said CRT faceplate structure for installation in said cabinet, wherein said chassis mounting pan includes protruding lugs for supporting cooperation with some of said mounting ears of said CRT.

4. The display assembly of claim 3 wherein said lugs each includes an enlarged aperture to enable small movements of said chassis mounting pan during assembly in said cabinet.

5. A unitary CRT display assembly comprising:
- a CRT having a faceplate and mounting ears attached thereto by an anti-implosion band;
- a chassis and a chassis mounting pan separate from said CRT and a mounting strap attached thereto for engaging said CRT near the periphery of said faceplate;
- means supporting said chassis mounting pan to said CRT by said strap; and
- means for enabling the position of said chassis mounting pan to be adjusted slightly with respect to said CRT for installation in a cabinet.

6. The display assembly of claim 5 wherein said last-mentioned means comprise adjustment means on said strap for adjusting the tension therein to enable slight movement of said mounting pan.

7. A unitary CRT display assembly for installation in a cabinet comprising:
- a CRT having a faceplate and mounting ears affixed to the periphery of said faceplate by an anti-implosion band;
- a chassis and a chassis mounting pan separate from said CRT, said chassis mounting pan including outwardly extending mounting lugs each having an enlarged aperture therein;
- means supporting said chassis mounting pan for slight movement with respect to said mounting ears during shipment and installation into said cabinet; and
- means for rigidly securing said chassis mounting pan to said cabinet.

8. The display assembly of claim 7 wherein said mounting ears and said mounting lugs are coupled together by removable plastic ties.

* * * * *